United States Patent
Liu

(10) Patent No.: US 12,238,788 B2
(45) Date of Patent: Feb. 25, 2025

(54) METHOD AND APPARATUS FOR ESTABLISHING RADIO BEARER

(71) Applicant: SPREADTRUM COMMUNICATIONS (SHANGHAI) CO., LTD., Shanghai (CN)

(72) Inventor: Xing Liu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 486 days.

(21) Appl. No.: 17/442,956

(22) PCT Filed: Jan. 14, 2020

(86) PCT No.: PCT/CN2020/071901
§ 371 (c)(1),
(2) Date: Sep. 24, 2021

(87) PCT Pub. No.: WO2020/192250
PCT Pub. Date: Oct. 1, 2020

(65) Prior Publication Data
US 2022/0191951 A1      Jun. 16, 2022

(30) Foreign Application Priority Data
Mar. 28, 2019   (CN) .......................... 201910244638.2

(51) Int. Cl.
H04W 76/10        (2018.01)
H04W 28/02        (2009.01)

(52) U.S. Cl.
CPC ....... H04W 76/10 (2018.02); H04W 28/0268 (2013.01)

(58) Field of Classification Search
CPC .......................... H04W 76/10; H04W 28/0268
See application file for complete search history.

(56) References Cited

U.S. PATENT DOCUMENTS

| 2014/0029536 A1 | 1/2014 | Tian et al. |
| 2014/0213221 A1* | 7/2014 | Chai ............... H04W 36/00837 |
| | | 455/411 |

(Continued)

FOREIGN PATENT DOCUMENTS

| CN | 103139930 A | 6/2013 |
| CN | 103517351 A | 1/2014 |

(Continued)

OTHER PUBLICATIONS

ZTE Corporation. "Introduction of mobility enhancement solutions in RRC" 3GPP TSG-RAN2 Meetings #97 R2-1802056, Feb. 28, 2017 (Feb. 28, 2017).

(Continued)

*Primary Examiner* — Chi H Pham
*Assistant Examiner* — Weibin Huang
(74) *Attorney, Agent, or Firm* — Occhiuti & Rohlicek LLP

(57) ABSTRACT

The present disclosure relates to a method and apparatus for establishing radio bearer. The method includes: receiving radio bearer configuration information of a second user equipment sent by the second user equipment; applying the radio bearer configuration information of the second user equipment; establishing a first radio bearer for sending data to the second user equipment based on the radio bearer configuration information of the second user equipment; and sending first data to the second user equipment through the first radio bearer, wherein the first data includes at least one of a data packet sent by a first user equipment to the second user equipment or a status report generated by the first user equipment in response to a data packet sent by the second user equipment.

19 Claims, 2 Drawing Sheets

(56) References Cited

U.S. PATENT DOCUMENTS

| | | | | |
|---|---|---|---|---|
| 2016/0374139 | A1* | 12/2016 | Chen | H04W 76/23 |
| 2017/0181206 | A1* | 6/2017 | Lee | H04W 76/32 |
| 2019/0239112 | A1* | 8/2019 | Rao | H04L 1/08 |
| 2019/0387446 | A1* | 12/2019 | Xu | H04W 36/0061 |
| 2020/0037132 | A1* | 1/2020 | Wu | H04W 76/14 |
| 2020/0107218 | A1* | 4/2020 | Wang | H04W 36/18 |
| 2020/0245113 | A1* | 7/2020 | Kang | H04W 4/06 |
| 2022/0110076 | A1* | 4/2022 | Shimoda | H04W 56/0045 |

FOREIGN PATENT DOCUMENTS

| | | |
|---|---|---|
| CN | 108390830 A | 8/2018 |
| CN | 108781385 A | 11/2018 |
| CN | 108809510 A | 11/2018 |
| CN | 107347215 B | 11/2019 |
| JP | 2010-521869 A | 6/2010 |
| WO | 2018066905 A1 | 4/2018 |
| WO | 2018203305 A1 | 11/2018 |
| WO | 2019029375 A1 | 2/2019 |

OTHER PUBLICATIONS

Huawei, HiSilicon. "Radio bearer configuration and management for NR sidelink" 3GPP TSG-RAN WG2 Meeting #104 R2-1816522, Nov. 30, 2018 (Nov. 30, 2018).

Lenovo, Motorolla Mobility. "Discussion on QoS management for NR V2X" 3GPP TSG-RAN WG2 Meeting #104 R2-1817118, Nov. 30, 2018 (Nov. 30, 2018).

ZTE . "Discussion on connection setup procedure" 3GPP TSG-RAN2 WG2 Meetings #95bis R2-166792, Oct. 14, 2016 (Oct. 14, 2016).

Chinese Office Action issued on Jul. 15, 2021 in CN Application No. 201910244638.2.

OPPO, "Discussion on QoS for NR / V2X", 3GPP TSG RAN WG2 #105 R2-1900173, 2019.

Spreadtrum Communications, "Discussion on SLRB configuration alignment", 3GPP TSG RAN WG2 #107b R2—Oct. 1, 2019 [1912231].

Huawei, HiSilicon, "Discussion on RLC mode for NR sidelink", 3GPP TSG RAN WG2 #104 R2-1818199, [ Nov. 2018 year ].

ZTE, Sanechips, "Consideration on QoS management for NR V 2X", 3GPP TSG RAN WG2 #104 R2 Nov. 2, 2018 [—1816988].

OPPO, "Summary of [104#55][NR/V2X] Unicast (OPPO)", 3GPP TSG RAN WG2 Meeting #105 R2-1900180, 2019.

Vivo, "Different destination service multiplexing in MAC", 3GPP TSG RAN WG2 Meeting #105 R2-1901116, 2019.

Japanese Office Action, dated Nov. 8, 2022 (4 pages).

Korean Office Action, dated Sep. 21, 2022 (5 pages).

Huawei: "Summary of Email Discussion [104#58] [NR V2X]—QoS support for NR V2X", 3GPP Draft; R2-1900370, 3rd Generation Partnership Project (3GPP), Mobile Competence Centre; 650, Route Des Lucioles; F-06921 Sophia-Antipolis Cedex, France, Feb. 15, 2019 (Feb. 15, 2019), pp. 1-57, XP051601766, Retrieved from the Internet: URL:http://www.3gpp.org/ftp/tsg%5Fran/WG2%5FRL2/TSGR2%5FI05/Docs/R2%2DI900370%2Ezip [retrieved on Feb. 16, 2019].

Huawei et al: "Discussion on RLC mode for 1-15 NR sidelink", 3GPP Draft; R2-1818199, 3rd Generation Partnership Project (3GPP), Mobile Competence Centre; 650, Route Des Lucioles ; F-06921 Sophia-Antipolis Cedex; France, vol. RAN WG2, No. Spokane, USA; Nov. 12, 2018 (Nov. 12, 2018), XP051557702, Retrieved from the Internet: URL:http://www.3gpp.org/ftp/Meetings%5F3GPP%5FSYNC/RAN2/Docs/R2%2DI818199%2Ezip [retrieved on Nov. 12, 2018].

Zte et al: "Consideration on Qos management for NR V2X", 3GPP Draft; R2-1816988 Consideration on QOS Management for NR V2X, 3rd Generation Partnership Project (3GPP), Mobile Competence Centre ; 650, Route Des Lucioles ; F-06921 Sophia-Antipolis Cedex ; France, vol. RAN WG2, No. Spokane, USA; Nov. 12, 2018-Nov. 16, 2018 Nov. 12, 2018 (Nov. 12, 2018), XP051556542, Retrieved from the Internet: URL:http://www.3gpp.org/ftp/Meetings%5F3GPP%5FSYNC/RAN2/Docs/R2%2DI816988%2Ezip ]retrieved on Nov. 12, 2018].

Session Chair (Intel Corporation) : "Report from session on LTE V2X and NR V2X", 3GPP Draft; R2-1902237, 3rd Generation Partnership Project (3GPP), Mobile Competence Centre ; 650, Route Des Lucioles ; F-06921 Sophia-Antipolis Cedex ; France, vol. RANWG2, No. Athens, Greece; Feb. 25, 2019-Mar. 1, 2019 Mar. 1, 2019 (Mar. 1, 2019), XP051603576, Retrieved from the Internet: URL:http://www.3gpp.org/ftp/tsg%5Fran/WG2%5FRL2/TSGR2%5FI05/Docs/R2%2DI902237%2Ezip [retrieved on Mar. 2, 2019].

Apple: "Discussion on RLC bi-directional 1-15 bearer setup for SL unicast", 3GPP Draft; R2-1915773, 3rd Generation Partnership Project (3GPP), Mobile Competence Centre ; 650, Route Des Lucioles ; F-06921 Sophia-Antipolis Cedex ; France, vol. RAN WG2, No. Reno, United States; 2019- Nov. 18, 2019-Nov. 22, Nov. 8, 2019 (Nov. 8, 2019), XP051817359, Retrieved from the Internet: URL:https://ftp.3gpp.org/tsg_ran/WG2_RL2/TSGR2_108/Docs/R2-1915773.zip R2-1915773_Bidirectional_RLC_Bearer.doc [retrieved on Nov. 8, 2019].

* cited by examiner

METHOD AND APPARATUS FOR ESTABLISHING RADIO BEARER

CROSS-REFERENCE

This Application is a National Stage of International Application No. PCT/CN2020/071901, filed on Jan. 14, 2020, which claims priority to Chinese Application No. 201910244638.2, filed on Mar. 28, 2019, both of which are incorporated by reference herein.

TECHNICAL FIELD

The present disclosure relates to the field of communication technology, and particularly to a method and apparatus for establishing radio bearer.

BACKGROUND

Information exchange between a vehicle and the outside world (vehicle to X (V2X), or vehicle to everything) is a key technology of future intelligent transportation system, and mainly studies vehicle data transmission schemes under the 3rd Generation Partnership Project (3GPP) communication protocol. The V2X communication includes Vehicle to Vehicle (V2V) communication, Vehicle to Infrastructure (V2I) communication and Vehicle to Pedestrian (V2P) communication. V2X applications may improve driving safety, reduce congestion and vehicle energy consumption, and improve traffic efficiency and vehicle-mounted entertainment information, etc.

In the V2X communication, the V2V communication is a communication mode that is different from ordinary wireless cellular network communication. In cellular networks, User Equipment (UE) communicates with base station equipment, while in the V2V communication, a UE communicates directly with another UE, and a link between the UEs becomes a sidelink (SL).

The fifth mobile communication refers to the fifth mobile phone communication standard, which is also referred to as the fifth generation mobile communication technology (abbreviated as 5G). 5G is also referred to as New Radio (NR), and the application of V2X may be supported in 5G. In relevant technologies, when the 5G NR communication is performed, data transmission between the US and the base station equipment is implemented by establishing a radio bearer (RB) and quality of service flow (QoS flow).

SUMMARY

In view of this, the present disclosure provides a method and apparatus for establishing radio bearer.

According to an aspect of the present disclosure, a method for establishing radio bearer, applied to a first user equipment, includes:
  receiving radio bearer configuration information of a second user equipment sent by the second user equipment;
  applying the radio bearer configuration information;
  establishing a first radio bearer for sending data to the second user equipment based on the radio bearer configuration information; and
  sending first data to the second user equipment through the first radio bearer,
  wherein the first data includes at least one of a data packet sent by the first user equipment to the second user equipment or a status report generated by the first user equipment in response to a data packet sent by the second user equipment.

According to a further aspect of the present disclosure, an apparatus for establishing radio bearer, applied to a first user equipment, includes:
  a processor; and
  a memory configured to store processor-executable instructions,
  wherein the instructions stored in the memory cause the processor to:
  receive radio bearer configuration information of a second user equipment sent by the second user equipment;
  apply the radio bearer configuration information;
  establish a first radio bearer for sending data to the second user equipment based on the radio bearer configuration information; and
  send first data to the second user equipment through the first radio bearer,
  wherein the first data includes at least one of a data packet sent by the first user equipment to the second user equipment or a status report generated by the first user equipment in response to a data packet sent by the second user equipment.

Other features and aspects of the present disclosure will become apparent from the following detailed descriptions of exemplary embodiments with reference to the accompanying drawings.

BRIEF DESCRIPTION OF THE DRAWINGS

The accompanying drawings, which are incorporated in and constitute a part of the specification, illustrate exemplary embodiments, features and aspects of the present disclosure and are used to explain the principle of the present disclosure.

DETAILED DESCRIPTION

Figure 1:
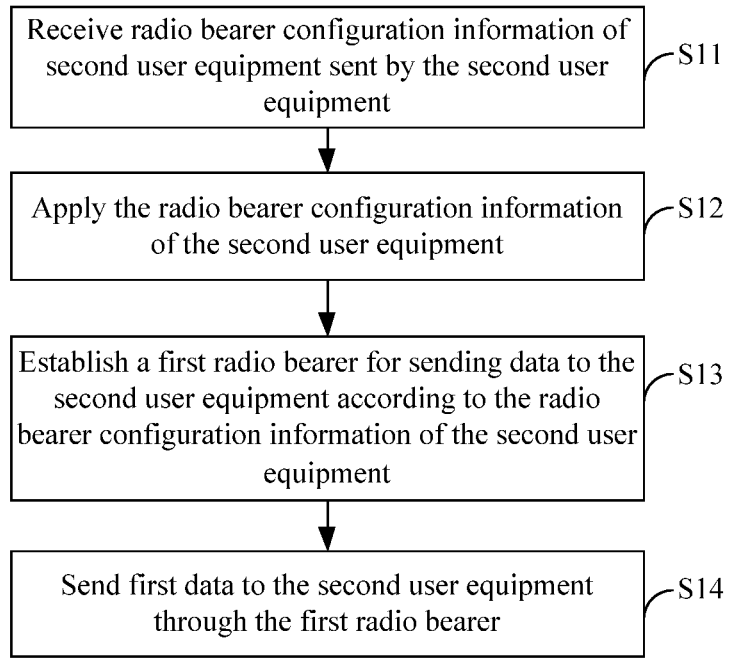
FIG. 1 illustrates a flow chart of a method for establishing radio bearer according to an embodiment of the present disclosure.

Various exemplary embodiments, features and aspects of the present disclosure are described in detail below with reference to the accompanying drawings. Reference signs in the drawings indicate elements with same or similar functions. Although various aspects of the embodiments are illustrated in the drawings, the drawings are not necessarily drawn to scale unless otherwise specified.

The term "exemplary" herein means "using as an example and an embodiment or being illustrative". Any embodiment described herein as "exemplary" should not be construed as being superior or better than other embodiments.

Furthermore, for better describing the present disclosure, numerous specific details are illustrated in the following detailed description. Those skilled in the art should understand that the present disclosure may be implemented without certain specific details. In some examples, methods, means, elements and circuits that are well known to those skilled in the art are not described in detail in order to highlight the main idea of the present disclosure.

In a 5G NR communication system, data transmission between user equipment and base station equipment is implemented by establishing radio bearers and QoS flows. It is necessary to map and associate a data packet from an upper layer to a QoS flow. One QoS flow has a corresponding QoS flow ID (QFI) and needs to be mapped and associated to a radio bearer. Different radio bearers may have different transmission parameter configurations to meet the requirements of different services. Generally, different radio bearers are identified by different radio bearer identities (radio bearer ID). In the 5G NR V2X, on a sidelink between the UEs, the data transmission between the UEs in a unicast scenario may adopt a QoS model of the data transmission between the user equipment and the base station equipment, that is, the radio bearer is established by adopting mapping and association from the data to QoS flow and from the QoS flow to the radio bearer on the sidelink between the UEs.

In the V2X communication, for two UEs that communicate with each other, the QoS flow and radio bearer established on the sidelink cannot be ensured to be consistent completely in terms of mapping rules and transmission parameter configuration, because the two UEs establish the QoS flow and the radio bearer based on respective core networks and base stations.

In the NR communication, an NR wireless protocol stack is divided into two planes, i.e., a user plane (UP) and a control plane (CP). The UP protocol stack is a protocol suite adopted in user data transmission. The CP protocol stack is a protocol suite adopted in control signaling transmission of the system. A UP protocol in the NR includes a Service Data Adaptation Protocol (SDAP) layer, a Packet Data Convergence Protocol (PDCP) layer, a Radio Link Control (RLC) layer, a Media Access Control (MAC) layer and a physical (PHY) layer successively from top to bottom. The SDAP layer is configured to execute the mapping and association from the QoS flow to the radio bearer and to identify the QFI in uplink and downlink data. The PDCP layer and the RLC layer are configured with the radio bearer as granularity. Different radio bearers correspond to independent PDCP entities and RLC entities. One radio bearer may correspond to one or more DPCP entities and RLC entities. The MAC layer is shared by a plurality of radio bearers and configured to multiplex the data transmitted by the plurality of radio bearers into one data packet to be sent by the PHY layer. When the MAC layer multiplexes the data of different radio bearers, a logical channel identity (LCID) of the corresponding radio bearer is carried in MAC sub headers of the data of different radio bearers so as to express that the data in the data packet is sourced from different radio bearers. After receiving the data packet, a receiver performs de-multiplexing on the data packet based on the LCD and sends the data in different radio bearers to the corresponding RLC entities and PDCP entities.

In the 5G NR V2X communication, the RLC layer performs data transmission in three modes, i.e., a transparent mode (TM), an unacknowledged mode (UM) and an acknowledged mode (AM). In the UM mode, a sender sends the data packet to the receiver through the radio bearer established with the receiver, and the receiver does not need to feed back the information to the sender. However, in the AM mode, the sender sends the data packet to the receiver through the radio bearer established with the receiver, and the receiver needs to return to the sender an RLC status report on whether the data packet is received successfully. The sender judges whether the data packet needs to be retransmitted based on the RLC status report received by the receiver and determines the data packet to be retransmitted from a retransmission buffer when it is determined that the retransmission is needed.

In some embodiments, when a radio bearer is established between UEs, there is a case where the radio bearer using the same LCID is established between the two UEs. That is, the first user equipment establishes the radio bearer with LCID=1 and is configured to send to the second user equipment the data packet 1 (corresponding to the configuration information of the first user equipment, where the data packet 1 here refers to data from a higher layer, and the higher layer is with respect to the RLC layer, that is, refers to the data generated by a protocol layer located above the RLC layer, for example, the data generated by an application program of an application layer, or an RRC signaling from the RRC layer, and the data packet in the subsequent description in the present disclosure refers to the data from the higher layer), and to receive the status report 1 (corresponding to the configuration information of the first user equipment, where the RLC status report belongs to the control signaling generated by the RLC layer, which does not belong to the data of the higher layer) returned by the second user equipment in response to the data packet 1; the second user equipment also establishes the radio bearer with the LCID=1 and is configured to send to the first user equipment the data packet 2 (corresponding to the configuration of the second user equipment) and to receive the status report 2 (corresponding to the configuration of the second user equipment) returned by the first user equipment in response to the data packet 2; and correspondingly, the first user equipment and the second user equipment are provided respectively with two RLC entities corresponding to the data transmission (i.e., receiving) in two directions of the radio bearer with the LCID=1. In the AM mode, when the first user equipment receives the data packet 2 sent by the second user equipment through the radio bearer with the LCID=1 and the status report 1 sent by the second user equipment in response to the data packet 1, because the data packet 2 and the status report 1 both are identified through LCID=1 in respective MAC sub headers, the MAC layer of the first user equipment cannot judge the data packet 2 and the status report 1 are sent to which RLC entity, resulting in confusion and errors in data receiving.

The above problems may be solved in two aspects. By taking the first user equipment as an example, the data packet 2 and the status report 1 are identified and sent to the corresponding RLC entities; the configurations of the data packet 2 and the status report 1 are unified, thereby ensuring that the RLC entities can unpack the data; and the first user equipment and the second user equipment receive the data packet 2 and the status report 1 through different radio bearers. The following are several implementation examples provided by the present disclosure, and those skilled in the art may modify the implementation examples according to the following examples and actual needs, which is not limited by the present disclosure.

Embodiment I

FIG. 1 illustrates a flow chart of a method for establishing radio bearer according to an embodiment of the present disclosure. As shown in FIG. 1, the method is applied to first user equipment. The method includes S11 to S14.

In S11, radio bearer configuration information of the second user equipment sent by the second user equipment is received.

In S12, the radio bearer configuration information of the second user equipment is applied.

In S13, a first radio bearer for sending data to the second user equipment is established (or updated) based on the radio bearer configuration information of the second user equipment.

In S14, first data is sent to the second user equipment through the first radio bearer.

The first data may include at least one of a data packet sent by the first user equipment to the second user equipment or a status report generated by the first user equipment in response to the data packet sent by the second user equipment.

In the present embodiment, the user equipment may be terminal equipment in various forms, including access terminals, subscriber units, subscriber stations, moving stations, mobile stations (built MS), remote stations, remote terminals, mobile equipment, user terminals, terminal equipment, wireless communication equipment, user agent or user apparatuses. The terminal equipment may also be a cellular phone, a cordless phone, a Session Initiation Protocol (SIP) phone, a Wireless Local Loop (WLL) station, a Personal Digital Assistant (PDA), handheld equipment with wireless communication functions, computing equipment or other processing equipment connected to wireless modems, vehicle-mounted equipment, wearable equipment, terminal equipment in the future 5G network or terminal equipment in the future evolved Public Land Mobile Network (PLMN), which is not limited in the present disclosure.

In the present embodiment, the application of the radio bearer configuration information may include the establishment of a radio bearer mapping rule based on the radio bearer configuration information.

Optionally, the radio bearer configuration information of the second user equipment may include at least one of a mapping and association rule between the data packet and a QoS flow of the second user equipment, a mapping and association rule between the QoS flow and the radio bearer of the second user equipment, or transmission parameters of the radio bearer of the second user equipment.

Optionally, the application of the radio bearer configuration information of the second user equipment may include at least one of:

a mapping and association rule between the data packet and the QoS flow of the first user equipment is established based on the mapping and association rule between the data packet and the QoS flow of the second user equipment;

a mapping and association rule between the QoS flow and the radio bearer of the first user equipment is established based on the mapping and association rule between the QoS flow and the radio bearer of the second user equipment; or transmission parameters of the radio bearer used by the second user equipment to send data is determined based on the transmission parameters of the radio bearer of the second user equipment.

Through the above method, the mapping and association rule from the data packet to the QoS flow, the mapping and association rule from the QoS flow to the radio bearer, and configuration of the transmission parameters of the radio bearer may be unified between the first user equipment and the second user equipment to ensure that the first user equipment and the second user equipment have the same configuration during the data transmission, so that the data packet sent by the first user equipment and the status report generated by the first user equipment in response to the data packet sent by the second user equipment both may have the same configuration, may be unpacked by the RLC entity, and may not need to be identified by the second user equipment after receiving. Therefore, the confusion and errors in the data receiving can be avoided, the accuracy of the data transmission between the user equipment through the radio bearer can be ensured, and the data transmission process of both of the user equipment is no longer affected by whether the radio bearer is the same one or not.

Optionally, prior to S12, the method further includes:

the radio bearer configuration information of the second user equipment is forwarded to a base station and/or a core network; and acknowledgement information for the radio bearer configuration information of the second user equipment sent by the base station and/or the core network is received.

In the implementation, when the first user equipment cannot establish the radio bearer mapping rule and radio bearer independently and needs to request the base station or core network, the first user equipment needs to forward the radio bearer configuration information to the base station and/or the core network after receiving the radio bearer configuration information, and then applies the radio bearer configuration information after obtaining the acknowledgement of the base station or core network. When the first user equipment can establish the radio bearer independently, it is unnecessary to forward the radio bearer configuration information to the base station or core network for acknowledging.

In embodiments of the present disclosure, the base station (BS) may also be referred to as base station equipment, which is an apparatus deployed in the radio access network (RAN) and configured to provide a radio communication function. For example, the equipment providing the base station function in a 2G network includes a base transceiver station (BTS); the equipment providing the base station function in a 3G network includes a NodeB; the equipment providing the base station function in a 4G network includes an evolved NodeB (eNB); the equipment providing the base station function in wireless local area networks (WLAN) is an access point (AP); and the equipment providing the base station function in the 5G new radio (NR) is gNB and continuously evolved node B (ng-eNB), wherein the gNB and the terminal are communicated through an NR technology, the ng-eNB and the terminal are communicated through an Evolved Universal Terrestrial Radio Access (E-UTRA) technology, and the gNB and ng-eNB may both be connected to the 5G core network. The base station in the embodiment of the present disclosure further includes equipment providing the base station function in a future novel communication system.

In the embodiment of the present disclosure, the core network may be an evolved packet core (EPC) and a 5G core network, and may also be a novel core network in the future communication system. The 5G core network is formed by a group of devices, and realizes access and mobility management functions (AMF) such as mobility management, a User Plane Function (UPF) providing packet routing and forwarding and QoS (Quality of Service) management, a Session Management Function (SMF) providing session management, IP address allocation and management, etc.

EPC may be composed of MME providing functions such as mobility management and gateway selection, a Serving Gateway (S-GW) providing a packet forwarding function, and a PDN Gateway (P-GW) providing functions such as terminal address allocation, rate control and the like.

Embodiment II

Figure 2:
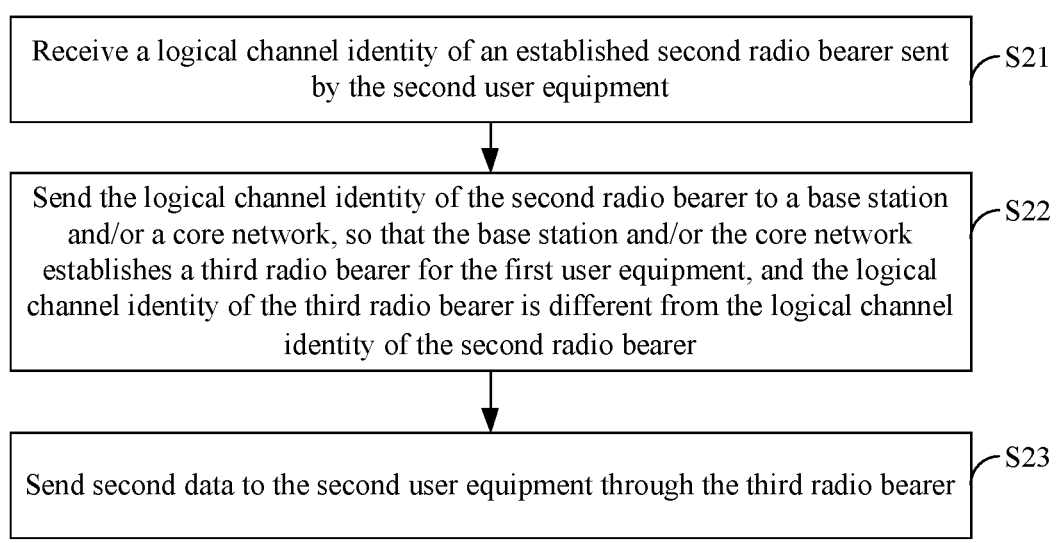
FIG. 2 illustrates a flow chart of the method for establishing radio bearer according to another embodiment of the present disclosure.

FIG. 2 illustrates a flow chart of the method for establishing radio bearer according to another embodiment of the present disclosure. As shown in FIG. 2, the method is applied to first user equipment. The method includes S21 to S23.

In S21, a logical channel identity of an established second radio bearer sent by the second user equipment is received.

In S22, the logical channel identity of the second radio bearer is sent to a base station and/or a core network, so that the base station and/or the core network establishes a third radio bearer for the first user equipment, and the logical channel identity of the third radio bearer is different from the logical channel identity of the second radio bearer.

In S23, second data is sent to the second user equipment through the third radio bearer.

The second data may include a data packet sent by the first user equipment to the second user equipment.

Optionally, the second radio bearer includes a radio bearer adopting an acknowledged mode (AM).

In the implementation, the second radio bearer is the radio bearer that is already established by the second user equipment and configured to send the data packet to the first user equipment. In this way, it can ensure that the logical channel identity of the third radio bearer established by the base station and/or the core network for the first user equipment is different from the logical channel identity of the second radio bearer.

Optionally, the method further includes:
Third data is sent to the second user equipment through the second radio bearer.
The third data may include a status report generated by the first user equipment in response to the data packet sent by the second user equipment through the second radio bearer.

In this way, the first user equipment may send the second data to the second user equipment through the third radio bearer. The first user equipment may return the status report (i.e., the third data) to the second user equipment through the second radio bearer after receiving the data packet sent by the second user equipment through the second radio bearer. In this way, the data packet sending process and the status report sending process of the first user equipment are carried out respectively through different radio bearers, so that the data receiving confusion of the UEs may be avoided.

Optionally, the method may further include: during the logical channel prioritization (LCP), when priorities corresponding to the third radio bearer and the second radio bearer are the same, the resources are allocated preferentially to the second radio bearer (i.e., the third data), that is, the third data is sent to the second user equipment preferentially through the second radio bearer.

In the implementation, according to the difference of data transmission task type, transmission time, transmission amount and the like, different radio bearers have different priorities. The transmission resources may be allocated preferentially to the radio bearer with high priority. When the second radio bearer and the third radio bearer have the same priorities, the priority of the third data is higher than the second data, and the first user equipment allocates the resources preferentially to the third data.

Embodiment III

Figure 3:
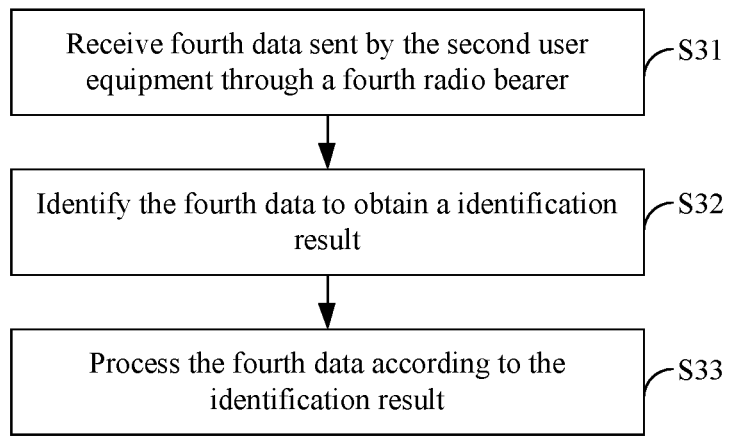
FIG. 3 illustrates a flow chart of the method for establishing radio bearer according to an embodiment of the present disclosure.

FIG. 3 illustrates a flow chart of the method for establishing radio bearer according to an embodiment of the present disclosure. As shown in FIG. 3, the method is applied to first user equipment. The method includes S31 to S33.

In S31, fourth data sent by the second user equipment through a fourth radio bearer is received.

In S32, the fourth data is identified to obtain a identification result.

In S33, the fourth data is processed based on the identification result.

The fourth data includes at least one of a data packet sent by the second user equipment to the first user equipment or a status report generated by the second user equipment in response to the data packet sent by the first user equipment through the fourth radio bearer.

In the implementation, before the second user equipment sends the fourth data, the fourth radio bearer is established between the second user equipment and the first user equipment to perform data transmission. The process in which the fourth radio bearer is established between the second user equipment and the first user equipment includes:

the second user equipment establishes the fourth radio bearer with a logical channel identity of M to send the data packet (data packet a) to the first user equipment and/or to receive the status report (i.e., status report a) sent by the first user equipment in response to the data packet (i.e., the data packet a) sent by the second user equipment to the first user equipment through the fourth radio bearer, and establishes a corresponding RLC entity; and in another aspect, the first user equipment also establishes the fourth radio bearer with the logical channel identity of M to receive the data packet (i.e., the data packet a) sent by the second user equipment and/or to send the status report (i.e., the status report a) in response to the data packet (i.e., the data packet a) sent by the second user equipment to the first user equipment through the fourth radio bearer, and establishes the corresponding RLC entity.

Moreover, the first user equipment also utilizes the fourth radio bearer to send a data packet (data packet b) to the second user equipment and/or to receive a status report (status report b) sent by the second user equipment in response to the data packet (i.e., the data packet b) sent by the first user equipment to the second user equipment through the fourth radio bearer, and establishes the corresponding RLC entity. The second user equipment may also utilize the fourth radio bearer to receive the data packet (i.e., the data packet b) sent by the first user equipment and/or to send the status report (i.e., the status report b) in response to the data packet sent by the first user equipment to the second user equipment through the fourth radio bearer, and establishes the corresponding RLC entity.

The fourth radio bearer described in the present disclosure refers to the radio bearer having the same LCID in the first user equipment and the second user equipment. Therefore, when the fourth radio bearer has the same LCID but different radio bearer ID in the first user equipment and the second user equipment, the fourth radio bearer may be considered as two different radio bearers. When the fourth radio bearer has the same LCID and the same radio bearer ID in the first user equipment and the second user equipment, the fourth radio bearer may be considered as one radio bearer.

The RLC entities for sending the data packet b and receiving the status report b in the first user equipment are the same RLC entity; the RLC entities for receiving the data packet a and sending the status report a in the first user equipment are the same RLC entity; the RLC entities for sending the data packet b and sending the status report a in the first user equipment may be the same or different; and correspondingly, the RLC entities for receiving the data packet a and receiving the status report b in the first user equipment may be the same or different.

The data transmission process includes at least one of: the first user equipment receives the data packet a (i.e., one type of the fourth data) sent by the second user equipment through the fourth radio bearer; the first user equipment sends the status report a in response to the data packet a to the second user equipment through the fourth radio bearer; the first user equipment sends the data packet b to the second user equipment through the fourth radio bearer; or the first user equipment receives the status report b (i.e., one of the fourth data) sent by the second user equipment in response to the data packet b through the fourth radio bearer.

In the implementation, the first user equipment sends different data to the corresponding RLC entity or RLC sublayer for processing after identifying the fourth data.

Optionally, the fourth data is identified to obtain the identification result, which may include any one of:
  an MAC layer of the first user equipment identifies the fourth data based on an RLC header of the fourth packet to obtain the identification result;
  the MAC layer of the first user equipment identifies the fourth data based on indication information carried in an MAC sub header of the fourth data to obtain the identification result; or
  a first RLC sublayer in an RLC layer of the first user equipment identifies the fourth data based on the RLC header of the fourth packet to obtain the identification result.

In the implementation, in a case where the configuration information of the first user equipment and the configuration information of the second user equipment are not unified, the configurations of the data packets send by the two user equipment are different. In an AM mode, when the two user equipment adopt the same radio bearer to actively transmit the data and feed back the status report, the fourth data received by the first user equipment is taken as an example to describe the embodiment III.

Since a "D/C" domain of the RLC header of different data is not the same when the second user equipment sends different data, the "D/C" domain occupies 1 bit, which is used to indicate whether the data is a data packet (i.e., data packet a) sent by the second user equipment to the first user equipment or a status report (i.e., status report b) generated by the second user equipment in response to the data packet sent by the first user equipment. The MAC layer of the first user equipment may identify the fourth data based on different RLC headers.

However, not all user equipment can identify the RLC header of the data. Therefore, the second user equipment may be controlled to mark different data by adding the indication information in the MAC sub header before sending the fourth data. In this way, the MAC layer of the first user equipment may identify the fourth data by identifying the indication information of the MAC sub header.

Figure 4:
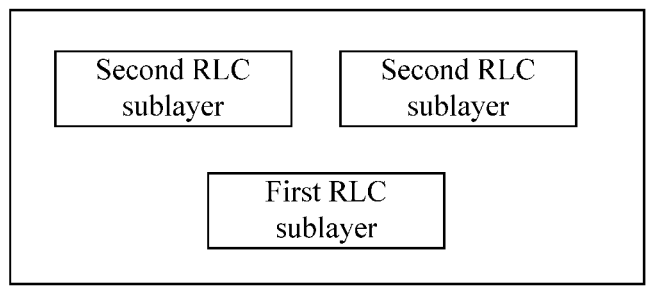
FIG. 4 illustrates a layering diagram of an RLC layer in the method for establishing radio bearer according to an embodiment of the present disclosure.

FIG. 4 illustrates a layering diagram of an RLC layer in the method for establishing radio bearer according to an embodiment of the present disclosure. As shown in FIG. 4, the RLC layer of the first user equipment may be divided into one or more RLC sublayers, wherein the first RLC layer may be used to identify the RLC header of the fourth data, for example, to identify the fourth data through the "D/C" domain. The second RLC sublayer in the RLC layer may be used to realize other functions of the RLC layer.

Optionally, the method may further include:
  during the logical channel prioritization (LCP), resources are allocated preferentially to the status report generated in response to the data packet sent by the second user equipment and sent to the second user equipment through the fourth radio bearer, when the data packet is sent and the status report generated in response to the data packet sent by the second user equipment is sent to the second user equipment through the fourth radio bearer, and the priority of the data packet sent to the second user equipment and the priority of the status report generated in response to the data packet sent by the second user equipment and sent to the second user equipment are the same.

In the implementation, since both of the first user equipment and the second user equipment send the data through the radio bearer with the logical channel identity of M, the first user equipment is taken as an example, there are cases that the status report a and the data packet b participate in packing simultaneously. Therefore, the first user equipment allocates the resources preferentially to the status report a, and allocates the surplus resources to the data packet b if there is any.

The method for establishing radio bearer provided by the embodiment of the present disclosure is applicable to 5 Generation (5G) communication systems, and also applicable to the 4G and 3G communication systems, and also applicable to various novel communication systems in the further such as 6G, 7G and the like. Moreover, the method for establishing radio bearer is also applicable to different network architectures, including but not limited to relay network architecture, double-link architecture, V2X architecture and other architectures.

It should be stated that although the foregoing embodiments are used as examples to introduce the method for establishing radio bearer as described above, those skilled in the art can understand that the present disclosure should not be limited to this. In fact, the user may completely flexibly set the steps according to individual preferences and/or actual application scenarios, as long as it conforms to the technical solution of the present disclosure.

Figure 5:
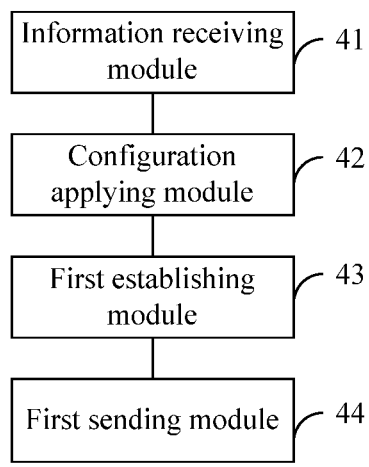
FIG. 5 illustrates a block diagram of an apparatus for establishing radio bearer according to an embodiment of the present disclosure.

FIG. 5 illustrates a block diagram of an apparatus for establishing radio bearer according to an embodiment of the present disclosure. As shown in FIG. 5, the apparatus is applied to first user equipment. The apparatus includes an information receiving module 41, a configuration applying module 42, a first establishing module 43 and a first sending module 44.

The information receiving module 41 is configured to receive radio bearer configuration information of second user equipment sent by the second user equipment.

The configuration applying module 42 is configured to apply the radio bearer configuration information of the second user equipment.

The first establishing module 43 is configured to establish a first radio bearer for sending data to the second user equipment based on the radio bearer configuration information of the second user equipment.

The first sending module 44 is configured to send first data to the second user equipment through the first radio bearer.

The first data includes at least one of a data packet sent by the first user equipment to the second user equipment or a status report generated by the first user equipment in response to the data packet sent by the second user equipment.

Optionally, the radio bearer configuration information of the second user equipment includes at least one of a mapping and association rule between the data packet and a QoS flow of the second user equipment, a mapping and association rule between the QoS flow and the radio bearer of the second user equipment, or transmission parameters of the radio bearer of the second user equipment.

Optionally, the configuration applying module 42 may include at least one submodule of:
  a first setting submodule, configured to establish a mapping and association rule between the data packet and the QoS flow of the first user equipment based on the mapping and association rule between the data packet and the QoS flow of the second user equipment;
  a second setting submodule, configured to establish a mapping and association rule between the QoS flow and the radio bearer of the first user equipment based on the mapping and association rule between the QoS flow and the radio bearer of the second user equipment; and
  a third setting submodule, configured to determine the transmission parameters of the radio bearer used by the second user equipment to send the data based on the transmission parameters of the radio bearer of the second user equipment.

Optionally, the apparatus may further include:
  an information forwarding module, configured to forward the radio bearer configuration information of the second user equipment to a base station and/or a core network; and
  an acknowledgement receiving module, configured to receive acknowledgement information for the radio bearer configuration information of the second user equipment sent by the base station and/or the core network.

Optionally, the apparatus may further include:
  an identity receiving module, configured to receive a logical channel identity of the established second radio bearer sent by the second user equipment;
  an identity forwarding module, configured to send the logical channel identity of the second radio bearer to the base station and/or the core network, so that the base station establishes a third radio bearer for the first user equipment, and the logical channel identity of the third radio bearer is different from the logical channel identity of the second radio bearer; and
  a second sending module, configured to send second data to the second user equipment through the third radio bearer,
  wherein the second data includes a data packet sent actively by the first user equipment to the second user equipment.

Optionally, the second radio bearer may include a radio bearer adopting an acknowledged mode.

Optionally, the apparatus may further include:
  a third sending module, configured to send third data to the second user equipment through the second radio bearer,
  wherein the third data may include a status report generated by the first user equipment in response to the data packet sent by the second user equipment.

Optionally, the apparatus may further include:
  a first preferential sending module, configured to during the logical channel prioritization, allocate the resources preferentially to the second radio bearer when priorities corresponding to the third radio bearer and the second radio bearer are the same.

Optionally, the apparatus may further include:
  a data receiving module, configured to receive fourth data sent by the second user equipment through the fourth radio bearer;
  a data identification module, configured to identify fourth data to obtain a identification result; and
  a data processing module, configured to process the fourth data based on the identification result,
  wherein the fourth data includes at least one of a data packet sent actively by the second user equipment to the first user equipment or a status report generated by the second user equipment in response to the data packet sent by the first user equipment through the fourth radio bearer.

Optionally, the data identification module may include any one submodule of:
  a first identification submodule, configured to identify the fourth data by the MAC layer of the first user equipment based on an RLC header of the fourth packet to obtain the identification result;
  a second identification submodule, configured to identify the fourth data by the MAC layer of the first user equipment based on indication information carried in the MAC sub header of the fourth data to obtain the identification result; and
  a third identification submodule, configured to identify the fourth data by the first RLC sublayer in the RLC layer of the first user equipment based on an RLC header of the fourth packet to obtain the identification result.

Optionally, the apparatus may further include:
  a second preferential sending module, configured to during the logical channel prioritization, allocate resources preferentially to the status report generated in response to the data packet sent by the second user equipment and sent to the second user equipment through the fourth radio bearer, when the data packet is sent and the status report generated in response to the data packet sent by the second user equipment is sent to the second user equipment through the fourth radio bearer, and the priority of the data packet sent to the second user equipment and the priority of the status report generated in response to the data packet sent by the second user equipment and sent to the second user equipment are the same.

It should be stated that although the foregoing embodiments are used as examples to introduce the apparatus for establishing radio bearer as described above, those skilled in the art can understand that the present disclosure should not be limited to this. In fact, the user may completely flexibly set the modules according to individual preferences and/or actual application scenarios, as long as it conforms to the technical solution of the present disclosure.

The apparatus for establishing radio bearer provided by embodiments of the present disclosure can avoid confusion and errors in data receiving, and ensure the accuracy of data transmission between the user equipment through the radio bearer.

In embodiments of the present disclosure, terms "and/or" used herein is only an association relationship describing the associated objects, which means that there may be three relationships, for example, A and/or B may mean three situations: A exists alone, both A and B exist, and B exists alone. In addition, the character "/" used here generally indicates that the associated objects are in an "or" relationship.

The descriptions using the terms of the first, second, third, and fourth in the embodiments of this disclosure are only used to illustrate and identify the objects described, without any order, and do not indicate the limitation of the number of devices or the amount of data in the embodiments of the present disclosure. The present disclosure does not limit this.

Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments disclosed herein understandable to one skilled in the art.

What is claimed is:

1. A method for establishing a radio bearer, applied to a first user equipment, comprising:
   receiving radio bearer configuration information of a second user equipment sent by the second user equipment;
   applying the radio bearer configuration information;
   establishing a first radio bearer for sending data to the second user equipment based on the radio bearer configuration information; and
   sending first data to the second user equipment through the first radio bearer,
   wherein the first data includes at least one of a data packet sent by the first user equipment to the second user equipment or a status report generated by the first user equipment in response to a data packet sent by the second user equipment,
   wherein the radio bearer configuration information of the second user equipment includes at least transmission parameters of the radio bearer of the second user equipment,
   wherein the method further comprises:
   forwarding the radio bearer configuration information of the second user equipment, which is unmodified and exactly same as the received radio bearer configuration information of the second user equipment sent by the second user equipment, to a base station and/or a core network.

2. The method according to claim 1, wherein the radio bearer configuration information further includes at least one of a mapping and association rule between the data packet and a Quality of Service (QOS) flow of the second user equipment, or a mapping and association rule between the QoS flow of the second user equipment and the radio bearer of the second user equipment.

3. The method according to claim 2, wherein said applying the radio bearer configuration information further comprises at least one of:
   establishing a mapping and association rule between the data packet and a QoS flow of the first user equipment based on the mapping and association rule between the data packet and the QoS flow of the second user equipment; or
   establishing a mapping and association rule between the QoS flow of the second user equipment and the first radio bearer based on the mapping and association rule between the QoS flow of the second user equipment and the radio bearer of the second user equipment.

4. The method according to claim 1, wherein the method further comprises:
   receiving acknowledgement information for the radio bearer configuration information of the second user information sent by the base station and/or the core network.

5. The method according to claim 1, wherein the method further comprises:
   receiving a logical channel identity of a second radio bearer sent by the second user equipment, the second radio bearer having been established between the first user equipment and the second user equipment;
   sending the logical channel identity of the second radio bearer to the base station and/or the core network, so that the base station establishes a third radio bearer for the first user equipment, a logical channel identity of the third radio bearer being different from the logical channel identity of the second radio bearer; and
   sending second data to the second user equipment through the third radio bearer,
   wherein the second data includes a data packet sent by the first user equipment to the second user equipment.

6. The method according to claim 5, wherein the second radio bearer includes a radio bearer adopting an acknowledged mode.

7. The method according to claim 5, wherein the method further comprises:
   sending third data to the second user equipment through the second radio bearer,
   wherein the third data includes a status report generated by the first user equipment in response to a data packet sent by the second user equipment through the second radio bearer.

8. The method according to claim 7, wherein the method further comprises:
   during logical channel prioritization, giving priority to allocating resources to the second radio bearer in a case that priorities corresponding to the third radio bearer and the second radio bearer are the same.

9. The method according to claim 1, wherein the method further comprises:
   receiving fourth data sent by the second user equipment through a fourth radio bearer;
   identifying the fourth data to obtain an identification result; and
   processing the fourth data based on the identification result,
   wherein the fourth data includes at least one of a data packet sent by the second user equipment to the first user equipment or a status report generated by the second user equipment in response to a data packet sent by the first user equipment through the fourth radio bearer,
   wherein said identifying the fourth data to obtain the identification result comprises any one of:
   identifying, by a Media Access Control (MAC) layer of the first user equipment, the fourth data based on a Radio Link Control (RLC) header of the fourth packet to obtain the identification result;

identifying, by the MAC layer of the first user equipment, the fourth data based on indication information carried in an MAC sub header of the fourth data to obtain the identification result; or identifying, by a first RLC sublayer in an RLC layer of the first user equipment, the fourth data based on the RLC header of the fourth packet to obtain the identification result.

10. The method according to claim 9, wherein the method further comprises:

during logical channel prioritization, in a case that the data packet and the status report generated in response to the data packet sent by the second user equipment are sent to the second user equipment through the fourth radio bearer, and a priority of the data packet sent to the second user equipment is the same as a priority of the status report generated in response to the data packet sent by the second user equipment and sent to the second user equipment, giving priority to allocating resources to the status report, which is generated in response to the data packet sent by the second user equipment and sent to the second user equipment through the fourth radio bearer.

11. An apparatus for establishing a radio bearer, applied to a first user equipment, comprising:

a processor; and a memory configured to store processor-executable instructions, wherein the instructions stored in the memory cause the processor to:

in a first information receiving module, receive radio bearer configuration information of a second user equipment sent by the second user equipment;

in a configuration applying module, apply the radio bearer configuration information;

in a first establishing module, establish a first radio bearer for sending data to the second user equipment based on the radio bearer configuration information; and in a first sending module, send first data to the second user equipment through the first radio bearer, wherein the first data includes at least one of a data packet sent by the first user equipment to the second user equipment or a status report generated by the first user equipment in response to a data packet sent by the second user equipment, wherein the radio bearer configuration information of the second user equipment includes at least transmission parameters of a radio bearer of the second user equipment, wherein the configuration applying module comprises at least a submodule of a third setting submodule, configured to determine transmission parameters of the radio bearer based on transmission parameters of the radio bearer of the second user equipment, wherein the instructions further cause an information forwarding module to forward the radio bearer configuration information of the second user equipment, which is unmodified and exactly same as the received radio bearer configuration information of the second user equipment sent by the second user equipment, to a base station and/or a core network.

12. The apparatus according to claim 11, wherein the radio bearer configuration information further includes at least one of a mapping and association rule between the data packet and a QoS flow of the second user equipment, or a mapping and association rule between the QoS flow of the second user equipment and a radio bearer of the second user equipment.

13. The apparatus according to claim 11, wherein the configuration applying module further comprises at least one submodule of:

a first setting submodule, configured to establish a mapping and association rule between the data packet and a QoS flow of the first user equipment based on the mapping and association rule between the data packet and the QoS flow of the second user equipment; or a second setting submodule, configured to establish a mapping and association rule between the QoS flow of the second user equipment and the first radio bearer based on the mapping and association rule between the QoS flow of the second user equipment and the radio bearer of the second user equipment.

14. The apparatus according to claim 11, wherein the apparatus further comprises:

an acknowledgement receiving module, configured to receive acknowledgement information for the radio bearer configuration information sent by the base station and/or the core network.

15. The apparatus according to claim 11, wherein the apparatus further comprises:

an identity receiving module, configured to receive a logical channel identity of a second radio bearer sent by the second user equipment, the second radio bearer having been established between the first user equipment and the second user equipment;

a second sending module, configured to send the logical channel identity of the second radio bearer to the base station and/or the core network, so that the base station establishes a third radio bearer for the first user equipment, a the logical channel identity of the third radio bearer being different from the logical channel identity of the second radio bearer; and a third sending module, configured to send second data to the second user equipment through the third radio bearer, wherein the second data includes a data packet sent by the first user equipment to the second user equipment.

16. The apparatus according to claim 15, wherein the second radio bearer includes a radio bearer adopting an acknowledged mode.

17. The apparatus according to claim 15, wherein the apparatus further comprises:

a fourth sending module, configured to send third data to the second user equipment through the second radio bearer, wherein the third data includes a status report generated by the first user equipment in response to a data packet sent by the second user equipment through the second radio bearer.

18. The apparatus according to claim 17, wherein the apparatus further comprises:

a logical channel prioritization module, configured to give priority to allocating resources to the second radio bearer, in a case that priorities corresponding to the third radio bearer and the second radio bearer are the same.

19. The apparatus according to claim 11, wherein the apparatus further comprises:

a second information receiving module, configured to receive fourth data sent by the second user equipment through the fourth radio bearer;

an identifying module, configured to identify the fourth data to obtain an identification result; and a processing module, configured to process the fourth data based on the identification result, wherein the fourth data includes at least one of a data packet sent by the second user equipment to the first user equipment or a status report generated by the second user equipment in response to a data packet sent by the first user equipment through the fourth radio bearer.

* * * * *